United States Patent
Yoon (10) Patent No.: US 9,660,231 B2
(45) Date of Patent: May 23, 2017

(54) BATTERY PACK

(71) Applicants: SAMSUNG SDI CO., LTD., Yongin-si, Gyeonggi-do (KR); ROBERT BOSCH GmbH, Stuttgart (DE)

(72) Inventor: Ji-Hyoung Yoon, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 0 days.

(21) Appl. No.: 13/733,799

(22) Filed: Jan. 3, 2013

(65) Prior Publication Data

US 2013/0202926 A1    Aug. 8, 2013

Related U.S. Application Data (60) Provisional application No. 61/594,763, filed on Feb. 3, 2012.

(51) Int. Cl.
    *H01M 2/10* (2006.01)
    *H01M 2/04* (2006.01)
    (Continued)

(52) U.S. Cl.
    CPC ......... *H01M 2/1022* (2013.01); *H01M 2/043* (2013.01); *H01M 2/1077* (2013.01);
    (Continued)

(58) Field of Classification Search
    USPC .............................. 429/82, 99–100
    See application file for complete search history.

(56) References Cited

U.S. PATENT DOCUMENTS

| | | | | |
|---|---|---|---|---|
| 5,709,280 A | * | 1/1998 | Beckley | H01M 2/1083 180/68.5 |
| 6,635,380 B1 | * | 10/2003 | Shimoda | H01M 2/043 429/148 |

(Continued)

FOREIGN PATENT DOCUMENTS

| | | |
|---|---|---|
| EP | 2 273 583 A1 | 1/2011 |
| EP | 2 390 941 A1 | 11/2011 |

(Continued)

OTHER PUBLICATIONS

EPO Search Report dated May 10, 2013, for corresponding European Patent application 13153578.3, (7 pages).

(Continued)

*Primary Examiner* — Ula C Ruddock
*Assistant Examiner* — Osei Amponsah
(74) *Attorney, Agent, or Firm* — Lewis Roca Rothgerber Christie LLP (57) ABSTRACT

There is provided a battery pack capable of improving the safety thereof. The battery pack includes a battery array, side plates, a top cover and end plates. The battery array includes a plurality of battery cells aligned in a first direction. The battery array is formed as a hexahedron having (1-1)th, (1-2)th, (2-1)th (2-2)th, (3-1)th and (3-2)th planes. The top cover is provided to the (1-1)th plane of the battery array, and has reinforcing frames respectively formed at both sides based on the first direction. The reinforcing frame includes vertical and horizontal frames. The end plates are provided to the (3-1)th and (3-2)th planes, respectively. The end plates are fixed to the top cover. A holding part pressing both sides of the top cover on the (1-1)th plane are provided to the side plates, respectively.

18 Claims, 9 Drawing Sheets

(51) Int. Cl.
  *H01M 10/0585* (2010.01)
  *H01M 10/6555* (2014.01)
  *H01M 10/613* (2014.01)
  *H01M 10/04* (2006.01)

(52) U.S. Cl.
  CPC ..... *H01M 10/0585* (2013.01); *H01M 10/613* (2015.04); *H01M 10/6555* (2015.04); *H01M 10/0413* (2013.01); *H01M 10/0481* (2013.01); *H01M 2220/20* (2013.01); *H01M 2220/30* (2013.01)

(56) References Cited

U.S. PATENT DOCUMENTS

| | | | | |
|---|---|---|---|---|
| 8,580,423 | B2* | 11/2013 | Kim | H01M 2/1061 429/121 |
| 9,178,191 | B2* | 11/2015 | Park | H01M 2/0434 |
| 2001/0049056 | A1 | 12/2001 | Saito et al. | |
| 2003/0017384 | A1* | 1/2003 | Marukawa | H01M 2/1077 429/120 |
| 2008/0057393 | A1* | 3/2008 | Onuki et al. | 429/159 |
| 2011/0020677 | A1* | 1/2011 | Shin | H01M 2/0277 429/71 |
| 2011/0027630 | A1 | 2/2011 | Tsutsumi et al. | |
| 2011/0165451 | A1 | 7/2011 | Kim et al. | |
| 2011/0293978 | A1 | 12/2011 | Kim | |
| 2011/0294000 | A1 | 12/2011 | Kim et al. | |

FOREIGN PATENT DOCUMENTS

| | | | |
|---|---|---|---|
| JP | 2001-229897 | 8/2001 | |
| JP | 2002-343324 A | 11/2002 | |
| JP | 2003-36819 | 2/2003 | |
| JP | 2003-249202 A | 9/2003 | |
| JP | 2007-213941 * | 8/2007 | ............. H01M 2/10 |
| KR | 1020070081584 A | 8/2007 | |
| KR | 1020090000307 A | 1/2009 | |
| KR | 10-2010-0123906 | 11/2010 | |
| KR | 1020110071563 A | 6/2011 | |
| KR | 10-2011-0081023 | 7/2011 | |
| KR | 10-2011-0129801 | 12/2011 | |
| KR | 10-2011-0131609 | 12/2011 | |

OTHER PUBLICATIONS

KIPO Office action dated Mar. 22, 2016, corresponding to Korean Patent application 10-2013-0009623, (8 pages).
SIPO Office action dated Apr. 5, 2016, with English translation, for corresponding Chinese Patent application 20130036675.7, (12 pages).
EPO Office Action dated Mar. 17, 2017, for corresponding European Patent Application No. 13153578.3 (7 pages).

* cited by examiner

BATTERY PACK

CROSS-REFERENCE TO RELATED APPLICATION

This application claims priority to and the benefit of U.S. Provisional Application No. 61/594,763, filed on Feb. 3, 2012, in the USPTO, the disclosure of which is incorporated herein in its entirety by reference.

BACKGROUND

1. Field

An aspect of the present invention relates to a battery pack.

2. Description of the Related Art

Secondary batteries are rechargeable and can be repeatedly used. Secondary batteries may be implemented as a battery cell used for portable small-sized electronic devices such as a cellular phone, a desktop computer, a laptop computer, a camera, or camcorder. Alternatively, secondary batteries may be implemented as a battery pack including a plurality of battery cells, used as a power source for driving motors of a high-power hybrid electric vehicle (HEV), an electric vehicle (EV), and the like.

Batteries used in a hybrid electric vehicle (HEV), etc. should implement high power and high capacity. For this reason, a battery pack is configured as one unit using a plurality of batteries, and a plurality of battery packs are electrically connected in series or parallel, so that the connected battery packs are operated as a high-capacity and high-power source.

Because of characteristics of the HEV, the battery pack should be fixed so as to not be arbitrarily separated due to vibration, etc. The battery pack may be fixed to a bottom of the HEV in various manners, in consideration of a cooling effect, etc. The cooling efficiency of HEV, PHEV and EV batteries depends on contact with a cooling member. Particularly, when a contact pressure between the cooling member and cells constituting the battery pack are different, the variation in temperature between the cells may be increased. Therefore, a structure of a battery pack is desirable in which a sufficient and substantially uniform pressure can be applied to a cooling member and cells.

SUMMARY

Embodiments provide a battery pack which prevents the distortion of the battery pack and increases the contact pressure between the battery pack and a cooling member.

Embodiments also provide a battery pack which allows a load for fixing the battery pack to be uniformly distributed to a plurality of battery cells provided in the inside of the battery pack.

According to an aspect of the present invention, a battery pack includes a battery array, side plates, a top cover and end plates.

The battery array includes a plurality of battery cells aligned in a first direction. The battery array has a (1-1)th plane on which terminals of the battery cells are aligned, a (1-2)th plane opposite to the (1-1)th plane, (2-1)th and (2-2)th planes formed up to the (1-2)th plane along both sides of the (1-1)th plane based on the first direction, and (3-1)th and (3-2)th planes formed up to the (1-2)th plane from both ends of the (1-1)th plane based on the first direction.

The top cover is provided to the (1-1)th plane of the battery array, and has reinforcing frames respectively formed at both sides based on the first direction. The reinforcing frame includes vertical and horizontal frames, and the longitudinal section of the reinforcing frame is formed in an 'L' shape.

The end plates are provided to the (3-1)th and (3-2)th planes, respectively. The end plates are fixed to the top cover.

The side plates are provided to the (2-1)th and (2-2)th planes, respectively. A holding part pressing both sides of the top cover on the (1-1)th plane are provided to the side plates, respectively. At least one first weight-saving hole may be formed in the side plate.

The side plate may be fixed to the end plate.

The horizontal frame of the reinforcing frame may be positioned at a bottom end of the holding part. At least one fastening hole may be formed in the holding part, and at least one protruding part corresponding to the fastening hole may be formed in the reinforcing frame.

At least one second weight-saving hole may be formed in the reinforcing frame.

The length of the horizontal frame may be formed longer than that of the holding part.

The reinforcing frame may be formed using a double injection method. The reinforcing frame may be formed using an insert injection method.

The reinforcing frame may be formed of a metal. The reinforcing frame may be formed of any one selected from the group consisting of stainless steel, carbon steel and aluminum (Al) alloy, or may be formed of a special steel including at least one selected from the group consisting of titanium (Ti), nickel (Ni), manganese (Mn) and chrome (Cr).

A cooling member may be provided to come in contact with the (1-2)th plane of the plurality of battery cells. The side plate may be fixed to the cooling member.

According to the present invention, side plates are directly fixed to a cooling member, so that it is possible to prevent warping of the battery pack and to increase the contact pressure between the battery pack and the cooling member.

Further, a reinforcing frame is provided to a top cover through double injection (particularly, insert injection), so that the pressure applied by a side plate can be uniformly distributed to battery cells.

Accordingly, the structural safety of the battery pack can be improved by preventing the warping of the battery pack, and the cooling efficiency can be increased by improving the contact pressure between the battery pack and the cooling member. Further, the lifetime of the battery pack can be increased by equalizing the cooling efficiency of the battery cells.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

A battery pack according to an embodiment of the present invention includes a battery array, side plates, a top cover and end plates. Hereinafter, components of the battery pack will be described in detail.

Figure 1:
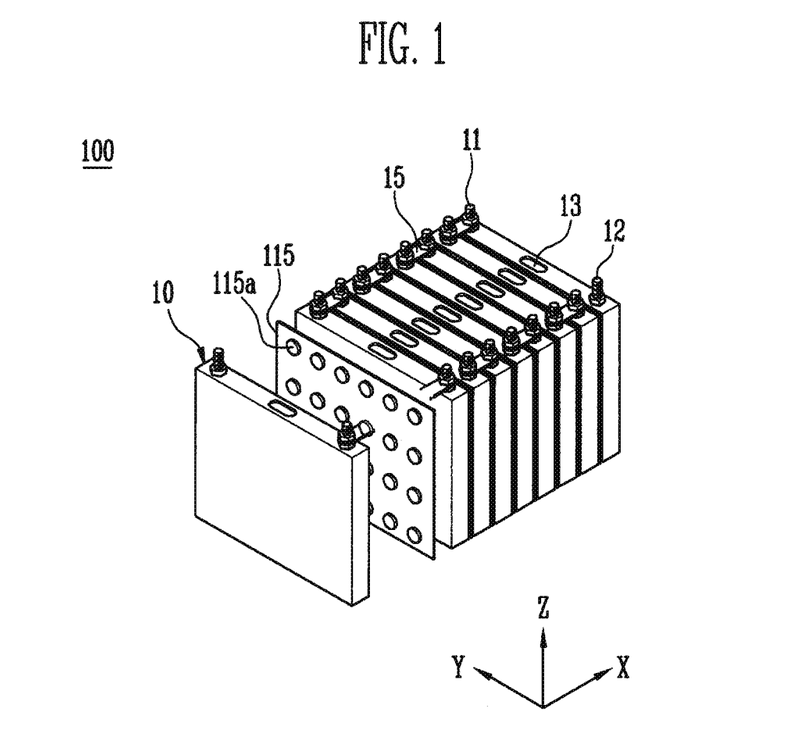
FIG. 1 is a partially exploded perspective view of a battery array.

The battery array according to this embodiment will be described with reference to FIG. 1. FIG. 1 is an exploded perspective view of the battery array.

The battery array includes a plurality of battery cells 10 arranged to extend in a first direction (X-direction on FIG. 1). Each of the battery cells 10 has first and second electrode terminals 11 and 12, and is provided with a vent part 13 through which gas in the battery cell 10 can be exhausted in a specific situation. A barrier 115 may be located between adjacent battery cells 10. Spacers 115a are provided on the barrier 115 to space the adjacent battery cells 10 from each other and to provide a flow path of a coolant for cooling the battery cells 10 by forming a space between the battery cells 10. Meanwhile, terminals of one battery cell 10 and another battery cell 10 adjacent thereto are connected to each other. The battery array 100 is formed in the shape of a rectangular parallelepiped. Hereinafter, for convenience of illustration, it is assumed that the XY plane on which the terminals of the battery cells are arranged is a (1-1)th plane, the plane opposite to the (1-1)th plane is a (1-2)th plane, planes parallel with the ZX plane formed up to the (1-2)th plane along both sides of the (1-1)th plane based on an X-axis direction are (2-1)th and (2-2)th planes, and the planes parallel with the YZ plane formed up to the (1-2)th plane from both ends of the (1-1)th plane based on the X-axis direction are (3-1)th and (3-2)th planes.

Hereinafter, the end plates, the side plates and the cooling member will be described with reference to FIGS. 2 and 3.

Figure 2:
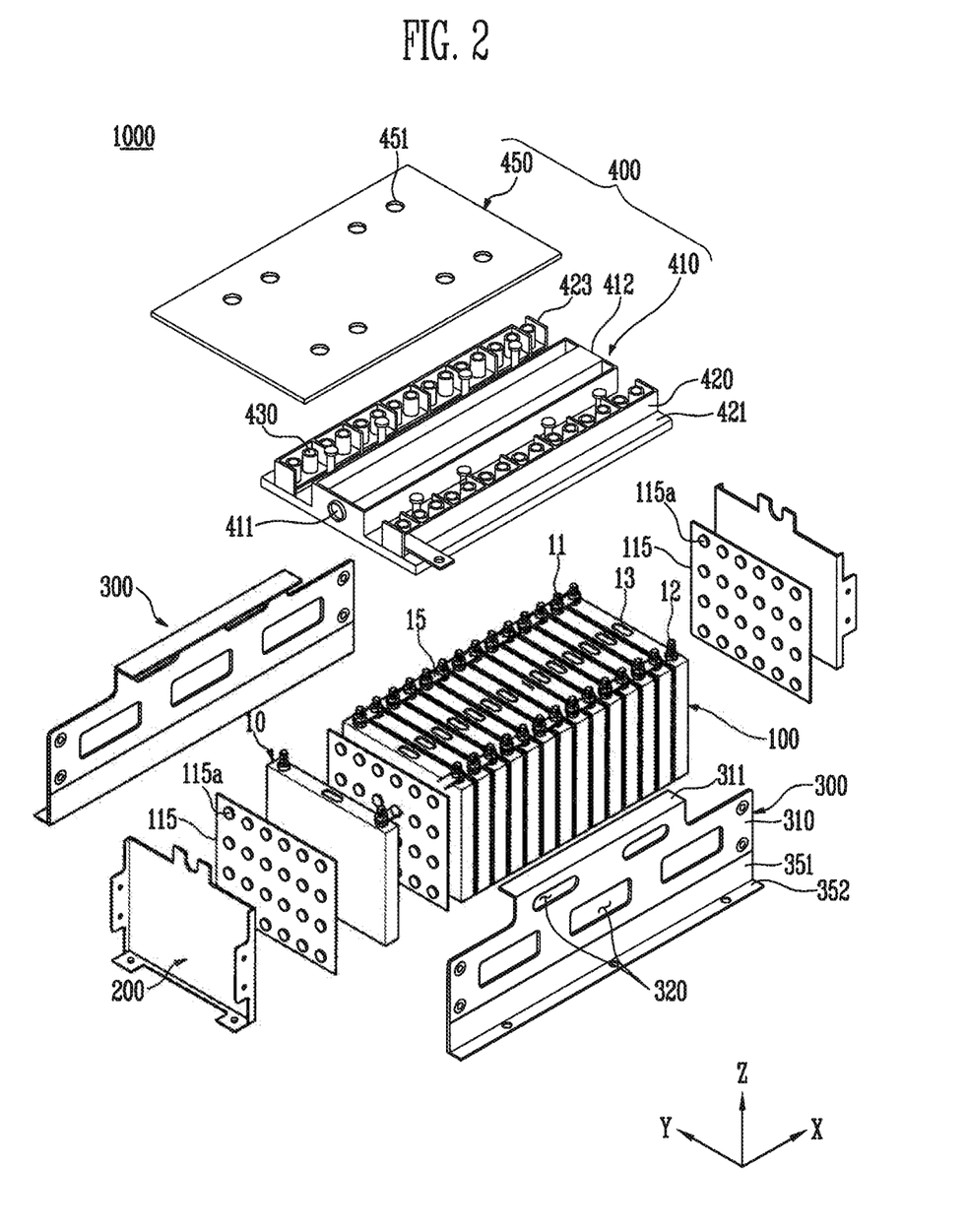
FIG. 2 is an exploded perspective view of a battery pack.
Figure 3:
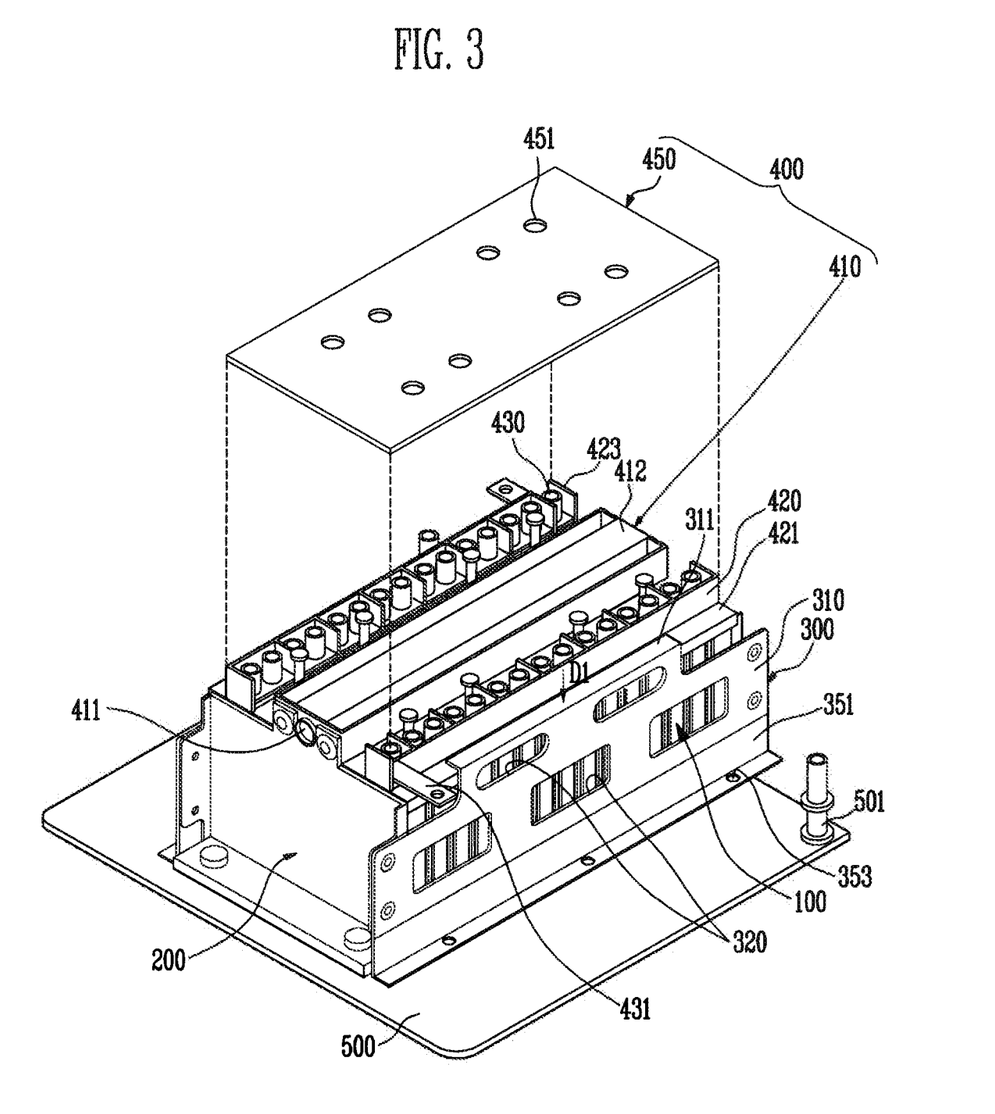
FIG. 3 is a perspective view showing an assembled battery pack of FIG. 2.

FIG. 2 is an exploded perspective view of a battery pack. FIG. 3 is a perspective view showing a state in which the battery pack is assembled.

The end plates 200 are provided to the (3-1)th and (3-2)th planes of the battery array 100, respectively. The end plates 200 are fixed to a cooling member 500, a top cover 400 and side plates 300, which will be described later. The fixing method is not particularly limited. For example, the fixing may be performed using bolts and nuts or may be performed using welding.

The side plates 300 are provided to the (2-1)th and (2-2)th planes of the battery array 100, respectively. The side plate 300 includes a main body 310 and a holding part 311. The main body 310 is adhered closely to the (2-1)th and (2-2)th planes of the battery array 100, and functions to prevent the battery cell 10 from being separated from the battery array 100 or to prevent the battery array 100 from being distorted in a lateral direction. The holding part 311 is extended along the (1-1)th plane from a top end of the main body 310. The holding part 311 pressurizes a side part of a first cover 410, which will be described later, in the direction D1 of the cooling member 500. Meanwhile, the main body 310 of the side plate 300 is fixed to the end plate 200. As described above, the fixing method is not particularly limited. Meanwhile, at least one first weight-saving opening 320 may be formed in the side plate 300. In the battery pack used for an electric vehicle (EV), etc., weight is also an important issue, as well as supporting of components. Therefore, as long as the strength necessary for maintaining the structure of the battery pack 1000 is maintained, the first weight-saving openings 320 may be formed in the side plate 300 without limiting the number and size of the first weight-saving openings. An extending part 351 is formed at a lower part of the side plate 300. The extending part 351 is extended along the (2-1)th and (2-2)th planes of the battery array 100. A fixing part 352 is formed to an outside from a bottom end of the extending part 351. The fixing part 352 may be fixed to the cooling member 500, which will be described above, using a bolt or the like. The side plates 300 are fixed to the cooling member 500, so that the holding parts 311 can more firmly pressurize both sides of the top cover 400. Meanwhile, at least one hole for weight saving may be formed in the extending part 351.

The cooling member 500 may be provided to the (1-2)th plane. The cooling member 500 is provided with two or more coolant inlet/outlet ports 501 so as to cool the battery pack through the inlet/outlet of the coolant. In this case, the end plates 200 and the side plates 300 may be fixed to the cooling member 500. As described above, the fixing method is not particularly limited.

Figure 4A:
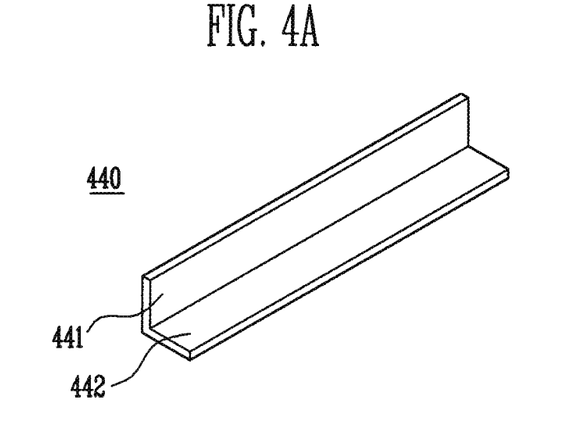
FIGS. 4A to 4C are perspective views showing various embodiments of a reinforcing frame.
Figure 4B:
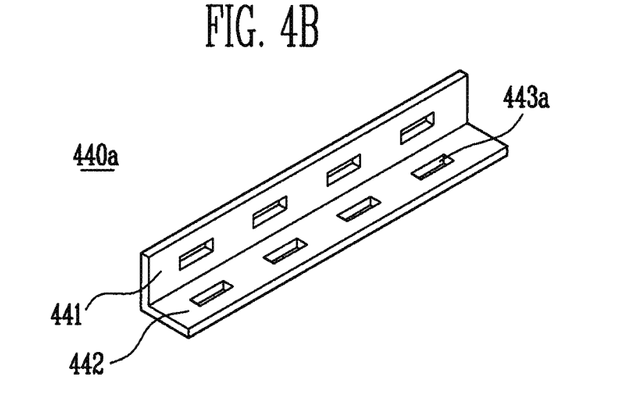
Figure 4C:
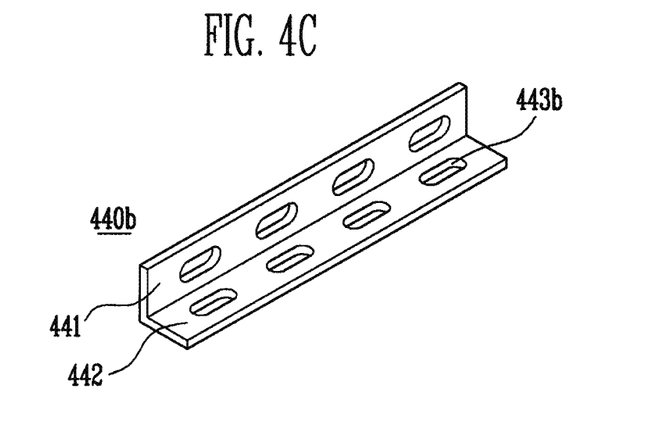
Figure 5:
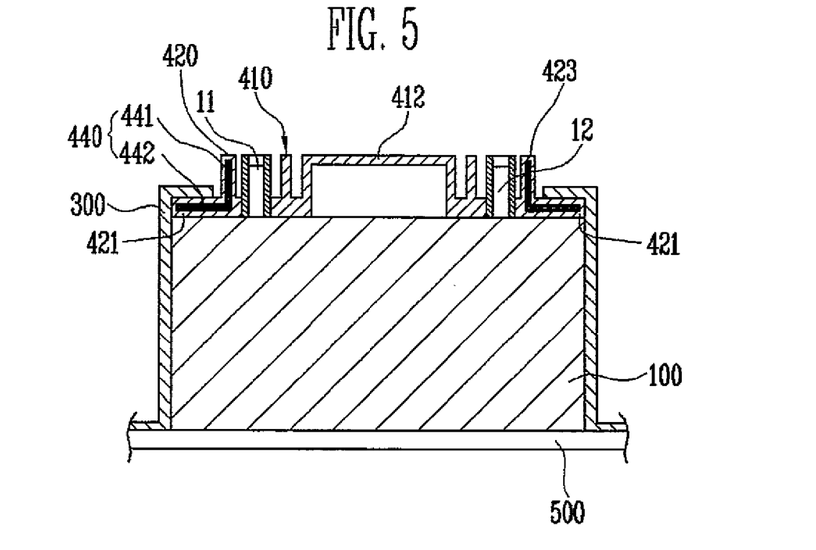
FIG. 5 is a longitudinal sectional view showing a battery pack provided with any of the reinforcing frames shown in FIGS. 4A to 4C.

The top cover and a reinforcing frame will be described with reference to FIGS. 2 to 5. FIGS. 4A to 4C are perspective views showing various embodiments of a reinforcing frame. FIG. 5 is a longitudinal sectional view showing a battery pack provided with the reinforcing frame shown in FIGS. 4A to 4C.

The top cover 400 is divided into first and second covers 410 and 450. The first cover 410 is provided to come in contact with a top of the battery array 100, and both end parts of the first cover 410 are fixed to the end plates 200. A degassing guide part 412 and a degassing opening 411 are formed in the first cover 410 to exhaust gas exhausted from each of the battery cells 10 to an outside of the battery pack.

The electrode terminals 11 and 12 of each of the battery cells 10 are protected from a risk such as a short circuit through a terminal cover 430 surrounding each of the electrode terminals 11 and 12. The top cover 400 is provided with a first partitioning wall 423 for spatially distinguishing the terminals connected to each other from other terminals to prevent a short circuit between the first and second electrode terminals 11 and 12, caused by a bolt, nut or other foreign matters. A second partitioning wall 420 is provided along the length direction of the top cover at the outside of sides of the terminal covers 430.

A second cover 450 may be provided to a top of the first cover 410 so as to prevent other foreign matters from coming into the first cover 410. In one embodiment, the second cover 450 is formed in the shape of the degassing guide part 412 having a flow path for degassing formed therein or in the shape of a plate covering the terminal covers 430 to be protected from the foreign matters. The second cover 450 is fastened to the first cover 410 through at least one fastening opening 451 using a bolt or the like.

In one embodiment, since the first cover 410 is primarily used for insulation and prevention of debris and other foreign matter, the first cover 410 is formed of a material such as synthetic resin so as to minimize the weight thereof. However, the pressure applied to both the sides of the top cover is concentrated on a part of the top cover by the holding part 311 of the side plate 300. Therefore, the battery pack 1000 may be warped or bent by the pressure, thereby resulting in damage of the structural safety of the battery pack 1000. For this reason, the battery pack is provided with a reinforcing frame which will be described below.

As shown in FIG. 4A, the reinforcing frame 440 is divided into a vertical frame 441 and a horizontal frame 442. The vertical frame 441 is extended vertically from one side of the horizontal frame 442 so that the longitudinal section of the vertical frame 441 has an 'L' shape. In one embodiment, an opening for weight saving may also be formed in the reinforcing frame. As shown in FIGS. 4B and 4C, at least one second weight-saving hole 443a or 443b having a quadrangular or circular shape may be formed in the reinforcing frame. That is, like the side plate 300, the second weight-saving holes 443a or 443b may be formed in the reinforcing frame without limiting the number and size of the second weight-saving holes 443a or 443b as long as the minimum strength of the reinforcing frame 440a or 440b is maintained.

The reinforcing frame may be formed of a metal to maintain a sufficient strength. Particularly, the reinforcing frame may be formed of any one selected from the group consisting of stainless steel, carbon steel and aluminum (Al) alloy, or may be formed of a special steel including at least one selected from the group consisting of titanium (Ti), nickel (Ni), manganese (Mn) and chrome (Cr). In one embodiment, the reinforcing frame 440 and the first cover 410 are manufactured using a double injection method. Particularly, as shown in FIG. 5, the reinforcing frame 440 and the first cover 410 are manufactured using an insert injection method so that the vertical frame 441 is provided within the second partitioning wall 420 of the first cover 410 and the horizontal frame 442 is provided within a side end part of the first cover 410.

The length of the reinforcing frame 440, particularly the length of the horizontal frame 442 maybe longer than the length of the holding part 311 so that the pressure concentrated on the holding part is efficiently distributed.

Accordingly, the reinforcing frames 440, 440a, 440b and 440c are commonly provided with the vertical and horizontal frames 441 and 442, so that it is possible to prevent the battery array 100 or the battery pack 1000 from being bent in a vertical direction and to uniformly distribute the pressure concentrated on the holing part 311 to the battery cells 10.

Figure 6A:
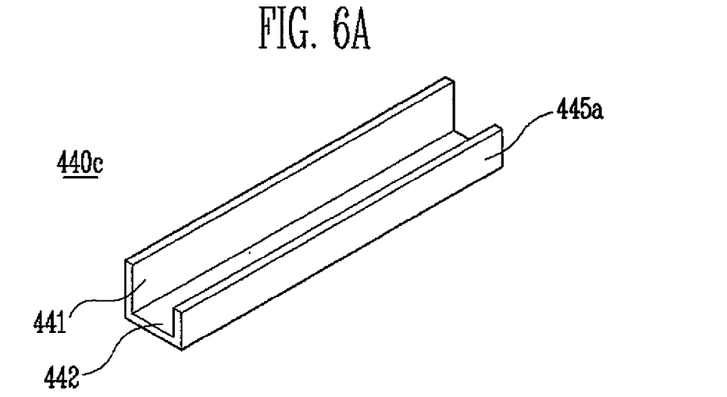
FIGS. 6A and 6B are perspective views showing another embodiment of a reinforcing frame.
Figure 6B:
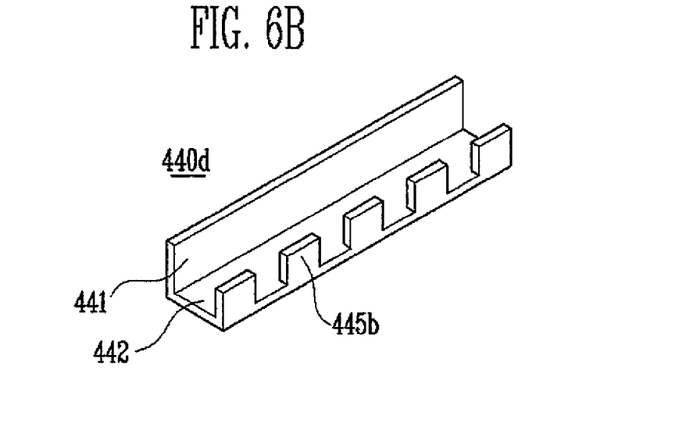
Figure 7A:
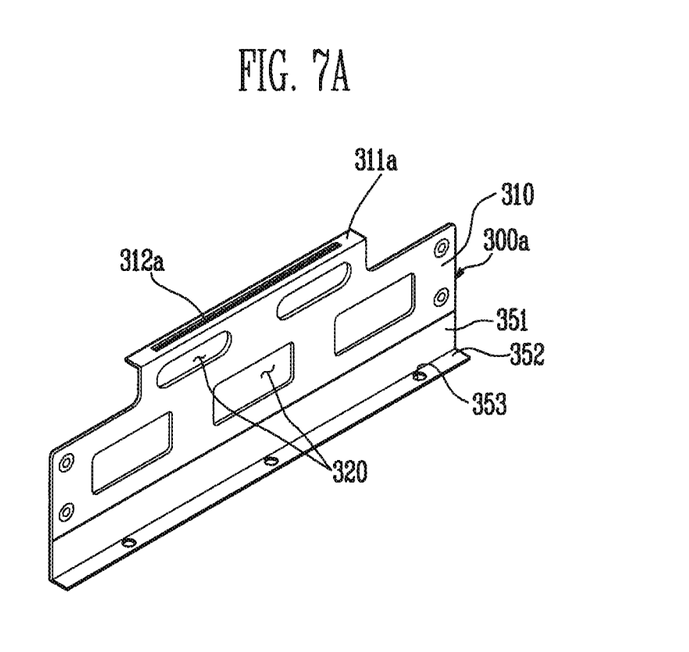
FIGS. 7A and 7B are perspective views showing side frames corresponding to the reinforcing frames of FIGS. 6A and 6B, respectively.
Figure 7B:
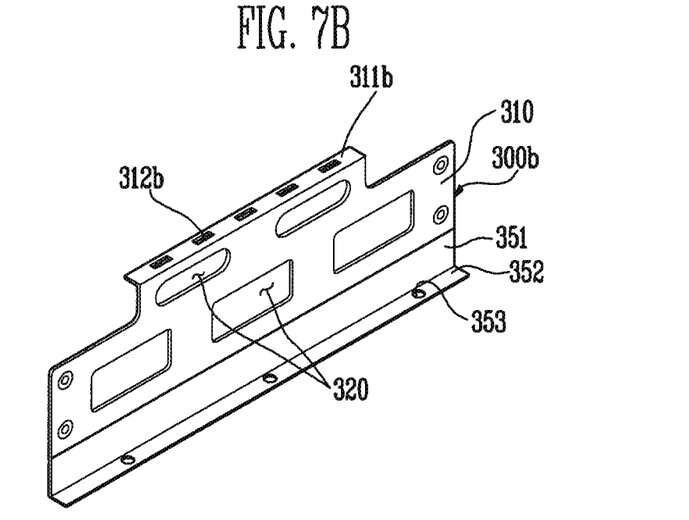
Figure 8:
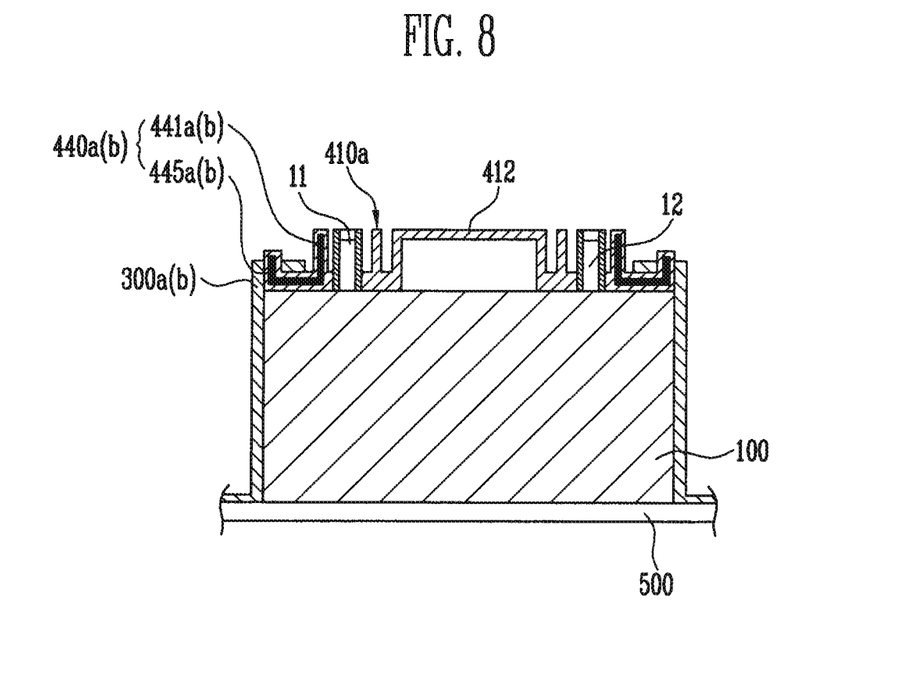
FIG. 8 is a longitudinal sectional view showing a battery pack provided with any of the reinforcing frame shown in FIGS. 6A and 6B.
Figure 9A:
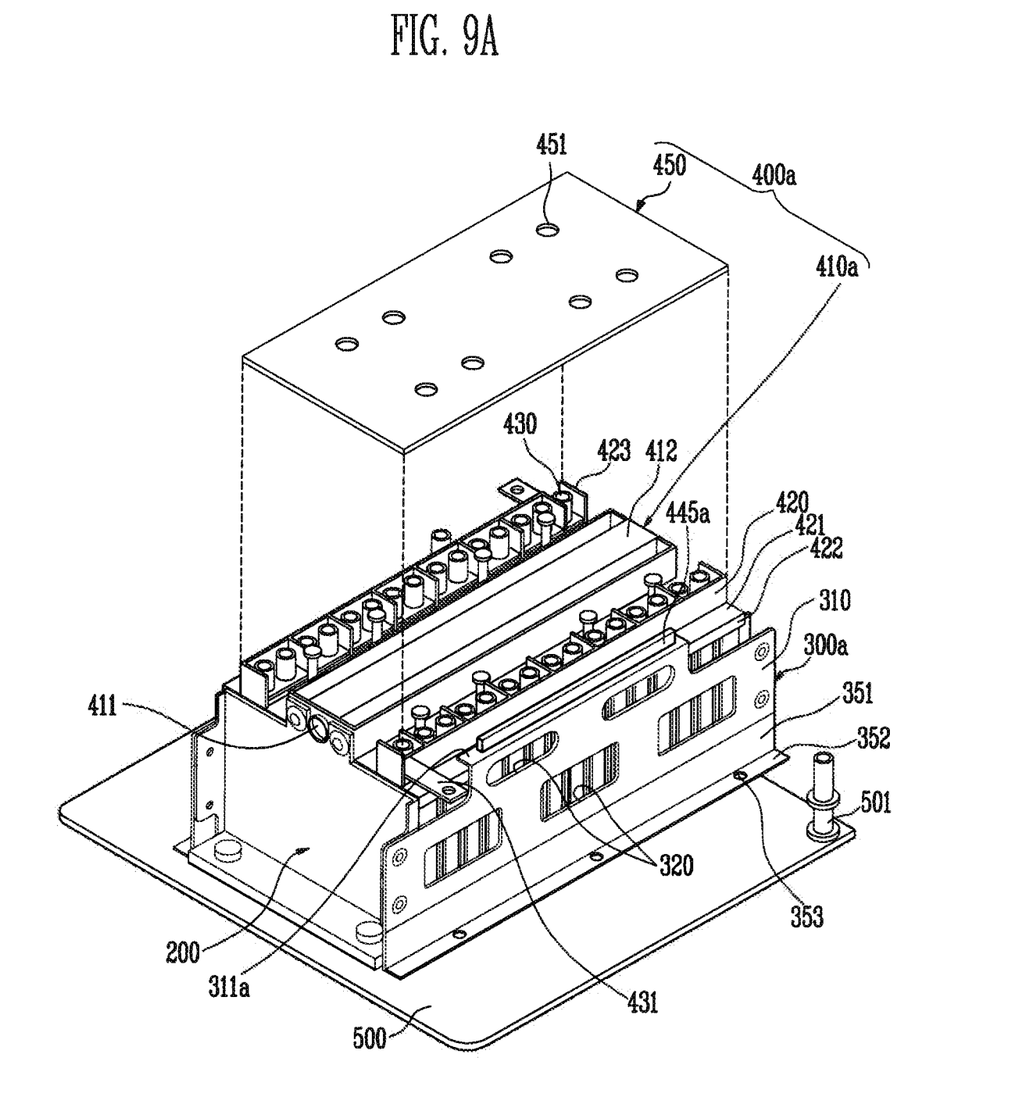
FIGS. 9A and 9B are perspective views showing battery packs provided with any of the reinforcing frames of FIGS. 6A and 6B, respectively.
Figure 9B:
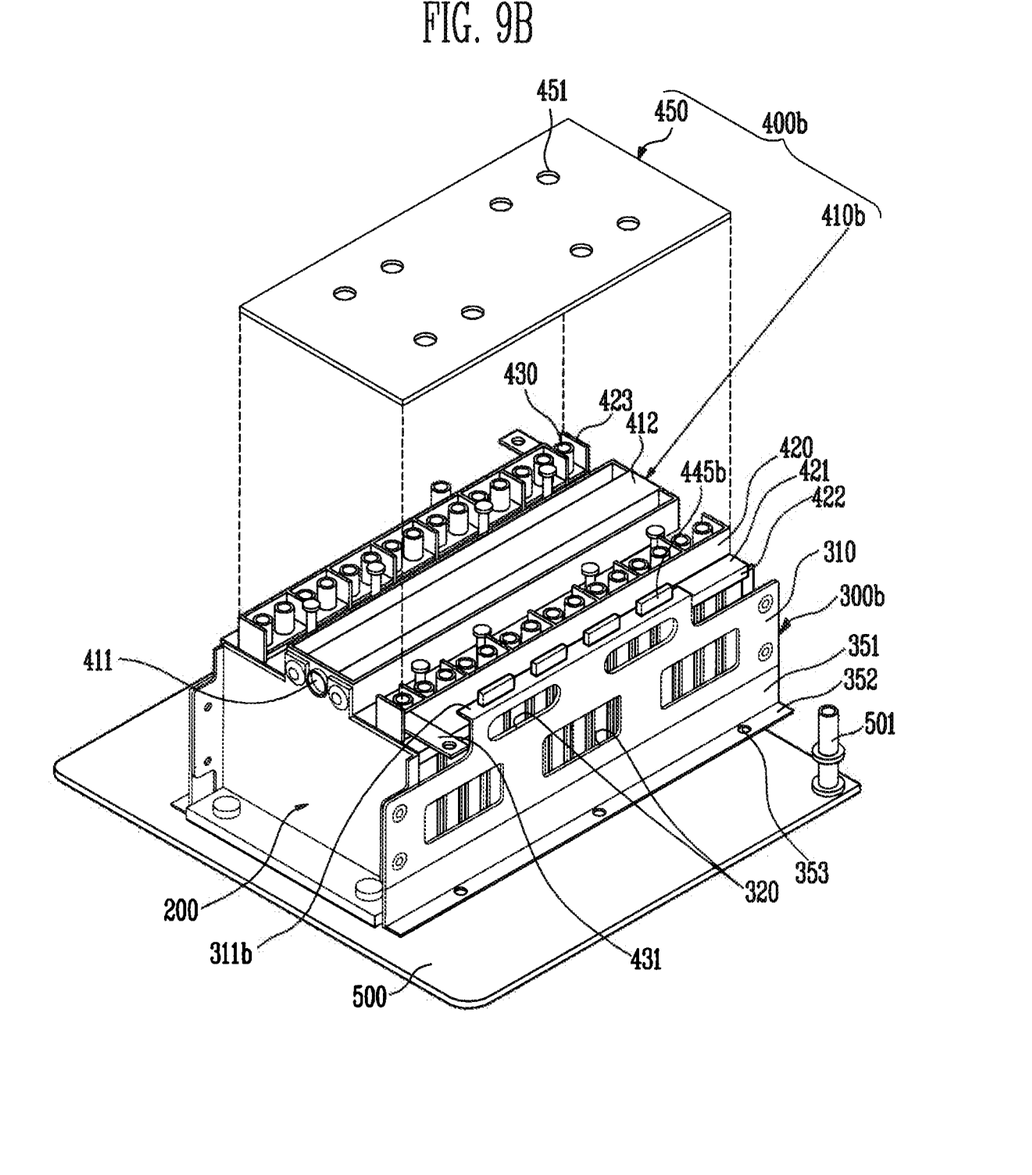

Top covers and reinforcing frames according to other embodiments of the present invention will be described with reference to FIGS. 6A to 9B. FIGS. 6A and 6B are perspective views showing another embodiment of the reinforcing frame. FIGS. 7A and 7B are perspective views showing side frames corresponding to the reinforcing frames of FIGS. 6A and 6B, respectively. FIG. 8 is a longitudinal sectional view showing a battery pack provided with the reinforcing frame shown in FIGS. 6A and 6B. FIGS. 9A and 9B are perspective views showing battery packs provided with the reinforcing frames of FIGS. 6A and 6B, respectively.

A protruding part 445a or 445b may be formed upward from an end part of the horizontal frame 442. A single protruding part 445a may be formed as shown in FIG. 6A, and two or more protruding parts 445b may be formed as shown in FIG. 6B. In one embodiment, the reinforcing frame 440d or 440e are provided within the first cover 410a or 410b using the insert injection method, and hence the protruding part 445a or 445b are insulated by being surrounded by the synthetic resin that is a material of the first cover 410a or 410b.

As shown in FIGS. 7A and 7B, a fastening opening 312a or 312b corresponding to the protruding part 445a or 445b may be formed in the holding part 311 of the side plate 300. That is, the fastening hole 312a or 312b is formed in the holding part 311 of the side plate 300 so as to correspond to the position, size and number of the protruding parts. When the battery pack is assembled, the protruding part 445a or 445b is exposed by passing through the fastening hole 312a or 312b. The protruding part 445a or 445b is fastened to the fastening hole 312a or 312b, so that it is possible to improve the structural safety of the battery pack and to prevent the warping of the battery pack. As described above, the reinforcing frames 440d and 440e are commonly provided with the vertical and horizontal frames 441 and 442, so that it is possible to prevent the battery array or the battery pack from being bent in the vertical direction and to uniformly distribute the pressure in the vertical direction, applied by the side plate 300a or 300b, to the battery cells 10.

As shown in FIG. 9A, the single protruding part 445a having a long length serves as another vertical frame in the state in which the protruding part 445a is exposed upward from the holding part 311 a, so that the structural safety of the battery pack can be more improved. When the plurality of protruding parts 445b are provided to the first cover 410b as shown in FIG. 9B, the fastening force between the first cover 410b and the holding part 311b of the side plate 300b is added, so that the structural safety of the battery pack can be more improved.

Meanwhile, the battery pack assembled as described above is connected another battery pack adjacent thereto through an external terminal 431, so that a battery module is formed as a unit larger than the battery pack.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
a battery array comprising a plurality of battery cells;
a pair of end plates, one of the pair of end plates at each end of the battery array;
a pair of side plates, one of the pair of side plates on each side of the battery array, wherein each of the side plates has a body and a holding part that extends from the body towards the battery array; and
a first cover being a single component and generally covering the battery array, the first cover comprising a wall, wherein the wall includes a first portion and a second portion perpendicular to the first portion, and contains a reinforcing member embedded entirely within the wall such that the wall of the cover entirely surrounds the reinforcing member,
wherein the reinforcing member is in at least one of the first portion and the second portion, and wherein the reinforcing member and the holding part overlap and extend parallel to each other along a length of the battery array.

2. The battery pack of claim 1, further comprising a second cover fastened to the first cover.

3. The battery pack of claim 1, wherein the reinforcing member extends substantially along an entire length of the wall.

4. The battery pack of claim 1, wherein the reinforcing member has a substantially L-shaped cross-section.

5. The battery pack of 1, wherein the wall is substantially L-shaped having the first portion and the second portion substantially perpendicular to the first portion.

6. The battery pack of claim 5, wherein the holding portion extends substantially perpendicularly to the body and wherein the holding portion covers at least some of the battery cells.

7. The battery pack of claim 1, wherein the holding portion of the side plate contacts the second portion of the wall.

8. The battery pack of claim 1, wherein the reinforcing member has a protrusion protruding from the wall.

9. The battery pack of claim 8, wherein the holding portion has an opening accommodating the protrusion.

10. The battery pack of claim 8, wherein the reinforcing member has a generally U-shaped cross-section.

11. The battery pack of claim 1, wherein each of the pair of side plates has a fixing portion that extends substantially perpendicularly to the body and away from the battery array, wherein the fixing portion is spaced from the holding portion.

12. The battery pack of claim 11, further comprising a cooling member coupled to the fixing portion.

13. The battery pack of claim 1, wherein the cover has a degassing guide extending along a length of the cover.

14. The battery pack of claim 13, wherein the degassing guide is an enclosed channel having an opening at one end configured to enable gas to escape therethrough.

15. The battery pack of claim 1, wherein each of the pair of ends plates is coupled to each of the pair of side plates and to the cover.

16. The battery pack of claim 1, wherein the reinforcing member and the cover comprise different materials.

17. The battery pack of claim 1, wherein the reinforcing member comprises stainless steel, carbon steel, aluminum, or a steel alloy.

18. The battery pack of claim 1, wherein the reinforcing member has at least one opening.

* * * * *